May 20, 1924.
J. C. BOYTON
OUTLET BOX
Filed March 13, 1920
1,494,412
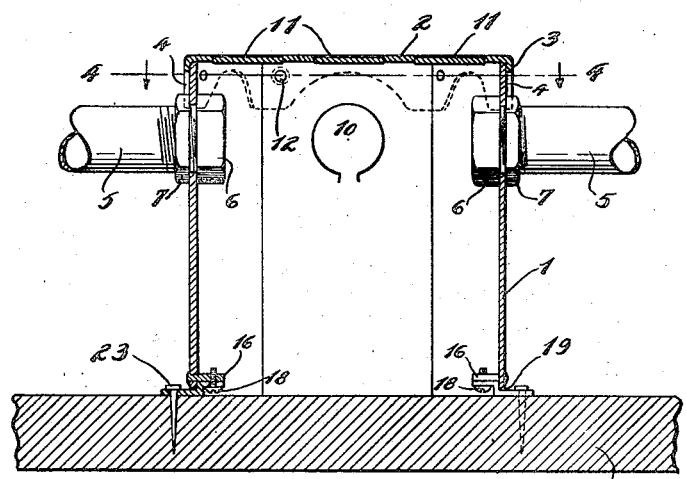
Fig.1
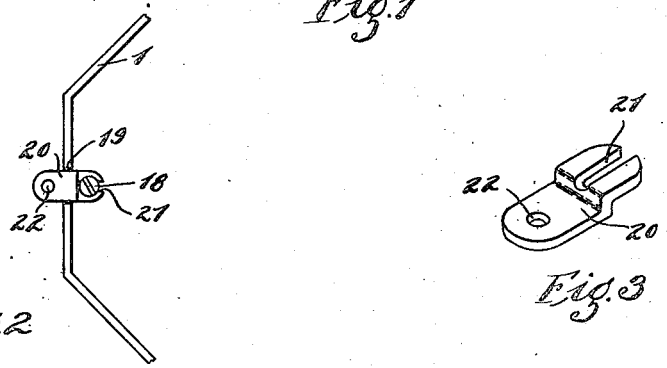
Fig.2
Fig.3
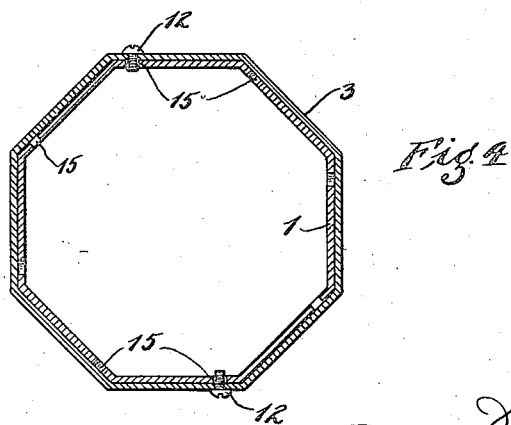
Fig.4
Inventor.
John C. Boyton
By Hull, Smith, Brock & West
Attys.

Patented May 20, 1924.

1,494,412

UNITED STATES PATENT OFFICE.

JOHN C. BOYTON, OF CLEVELAND, OHIO, ASSIGNOR TO THE ADAPTI COMPANY, OF CLEVELAND, OHIO, A CORPORATION OF OHIO.

OUTLET BOX.

Application filed March 13, 1920. Serial No. 365,405.

*To all whom it may concern:*

Be it known that I, JOHN C. BOYTON, a citizen of the United States, residing at Cleveland, in the county of Cuyahoga and State of Ohio, have invented a certain new and useful Improvement in Outlet Boxes, of which the following is a full, clear, and exact description, reference being had to the accompanying drawings.

This invention relates to improvements in outlet boxes used in electrical work, and to means for temporarily attaching the box to the form boards or members of the molds used in poured concrete constructions, the objects being to provide a box that is particularly convenient of use, and an inexpensive ear or clip that may be detachably secured to the box and which projects exteriorly thereof so that, by driving a nail through an aperture of the ear or clip, a workman may very easily attach the outlet box to the form boards or members of the mold, thereby to hold the box in place during the pouring operation and the hardening process. This arrangement also greatly facilitates the removal of the form boards or members, after the concrete hardens.

The nature and use of the invention will be more fully understood from the following description and by reference to the drawing accompanying and forming a part hereof and wherein Fig. 1 is a central vertical section through an outlet box constructed in accordance with my invention and attached to a form board by means of the detachable ear; Fig. 2 is a fragmentary bottom plan view of the box with the ear attached; Fig. 3 is a perspective view of the ear; and Fig. 4 is a section on the line 4—4 of Fig. 1, with the parts below the plane of section omitted to avoid confusion.

The body portion 1 of the box is constructed of sheet metal, is shown as octagonal in plan, and open at both ends. One end is adapted to be closed by a cover 2 having a peripheral flange 3 that overhangs the end of the box, and each face of the flange corresponding to one of the eight faces of the box is notched at 4 to accommodate a conduit 5 which is adapted to be attached to one of four walls of the box by having its threaded end inserted through a knockout opening in the wall and clamped thereto by nuts 6 and 7 situated on the inner and outer sides of the wall, respectively. The knockout openings are originally closed by slugs 10 that are partially struck from the wall in the process of manufacture and in accordance with the usual practice. The cover 2 has knockout slugs 11.

Two screws 12 are shown as extending through threaded holes in opposed faces of the flange 3 at diametrically opposite points of the cover, and the inner ends of these screws are adapted to engage within unthreaded apertures 15 in the adjacent walls of the box. It will be noted that each of the walls of the box has an aperture 15 so that regardless of what faces of the box are mated with those of the flange which contain the screws 12 when the cover is applied, there will be apertures 15 to receive the screws.

Inset a short distance from what may be termed the open end of the box and projecting inwardly from opposed walls thereof, are lugs 16. These lugs have tapped holes into which screws 18 are threaded and they constitute means for attaching lighting fixtures or other devices to the box. Adjacent each lug 16, the edge of the corresponding wall is notched at 19 to a depth and width sufficient to accommodate one of the ears 20, and the inner end of each ear is notched at 21 for engagement between the head of one of the screws 18 and the outer face of the corresponding lug 16. The ear is formed to extend downwardly and outwardly through the adjacent notch 19 so that its outer end projects well beyond the exterior of the box where it is provided with an aperture 22 through which a workman may insert a nail 23 and drive it into the form board 25 thereby to hold the box in correct position against accidental displacement. The ears, being situated exteriorly of the box, enable the workman to very easily and quickly attach the box to the form board, in contradistinction to the awkward and unsatisfactory method heretofore employed of passing the nails through the holes of the inside lugs 16 and driving them by means of a special hammer or other tool from the upper end of the box before the cover 2 is applied. After the concrete hardens, the form boards are withdrawn from the nails 23, and then, by loosening the screws 18, the ears 20 may be readily detached.

Having thus described my invention, what I claim is:—

1. An ear for temporarily attaching an outlet box to a mold form and comprising a device having its inner end arranged for detachable connection to the box interiorly thereof, and its opposite end arranged for attachment to the form exteriorly of the box.

2. The combination, with an outlet box, of an ear for temporarily attaching said box to a mold form, the ear being designed to extend from the inside of the box to a point exteriorly thereof, and means situated inside the box for detachably connecting the ear to the box, the ear having means exteriorly of the box for securing it to the form.

3. The combination with an outlet box having an open end and a lug extending inwardly from the side of the box and spaced from the open end, and a screw threaded in said lug; of an ear arranged for attachment to said lug by means of said screw and designed to extend exteriorly of the box, the ear having means outside the box whereby it may be attached to a mold form.

4. The combination with an outlet box having an open end and lugs inset from said open end and screws threaded within said lugs, of an ear for attachment to each lug by means of the respective screw, said ear being formed to extend outwardly about the edge of the open end exteriorly of the box where it is provided with means whereby it may be detachably connected to a mold form.

5. The combination with an outlet box having an open end and a lug extending inwardly from the wall of the box and inset from the open end, the edge of said wall being notched adjacent said lug, and a screw threaded into the lug; of an ear being designed for attachment to the lug and to extend outwardly through the notch so that the outer face of the ear does not project beyond the plane of the open end of the box, the ear being provided with means exteriorly of the box whereby it may be detachably connected to a mold form.

6. The combination with an outlet box having an open end and a lug extending inwardly from the wall of the box and inset from the open end, the edge of said wall being notched adjacent said lug, and a screw threaded into the lug of an ear having a part designed to bear against the lug and shaped to extend from said part toward the open end of the box and then outwardly through the notch so that the outer face of the last mentioned end does not project beyond the plane of the open end of the box, the ear being provided with an aperture exteriorly of the box, the aforesaid lug being spaced from the open end of the box a distance equal to or greater than the aggregate thicknesses of the inner end of the ear and the head of the aforesaid screw.

7. An open ended regular polygonal outlet box, a cover having a peripheral polygonal flange adapted to fit over the end of the box, and screws threaded through opposed faces of the flange at diametrically opposite points with respect to the cover, each face of the box having an unthreaded aperture wherewith one of said screws registers when the cover is applied to the box with one of the aforesaid opposed faces of the flange mating with the respective face of the box.

8. An open ended polygonal outlet box of which all faces are equal, a cover having a flange of corresponding polygonal shape arranged to fit over said open end, and holding means carried by and adapted to be projected through one face of the flange, each face of the box having a recess designed to receive said holding means and bearing the same relation to its respective face of the box as the holding means bears to the face of the flange whereby it is carried, whereby said holding means is automatically brought into register with one of the recesses when the cover is applied to the box regardless of the angular relation between the cover and box.

In testimony whereof, I hereunto affix my signature.

JOHN C. BOYTON.